United States Patent [19]

Dompas

[11] 4,303,227
[45] Dec. 1, 1981

[54] APPARATUS FOR CUTTING A MOVING METALLIC STRIP INTO UNIFORM PIECES

[75] Inventor: John M. A. Dompas, Olen, Belgium

[73] Assignee: Metallurgie Hoboken-Overpelt, Brussels, Belgium

[21] Appl. No.: 106,106

[22] Filed: Dec. 21, 1979

[30] Foreign Application Priority Data

Jun. 18, 1979 [EP] European Pat. Off. .......... 79200312.1

[51] Int. Cl.³ .................................................. B23K 7/10
[52] U.S. Cl. ........................................ 266/69; 266/50; 266/67; 219/121 PC
[58] Field of Search ............... 266/50, 60, 65, 67, 266/69; 219/121 PC, 121 PH, 121 PD, 121 PE, 121 PF, 121 PG

[56] References Cited

U.S. PATENT DOCUMENTS

| | | | |
|---|---|---|---|
| 3,443,803 | 5/1969 | Wernike | 266/50 |
| 3,443,805 | 5/1969 | Greenberger | 266 50/ |
| 3,462,134 | 8/1969 | Michelson | 266/50 |
| 4,001,051 | 1/1977 | John | 266/50 |

Primary Examiner—L. Dewayne Rutledge
Assistant Examiner—John P. Sheehan
Attorney, Agent, or Firm—Pennie & Edmonds

[57] ABSTRACT

An improved cutting apparatus of the type comprising an endless roller conveyor (4) for carrying a moving strip (1), a carriage (9) located above the strip (1) and adapted to move in the same direction as the strip (1) and in the opposite direction and a thermal cutting device (12) carried by the carriage (9) and adapted to move transversally to the moving strip (1). The conveyor (4) is adapted to revolve in such way that its upper run continuously moves in the direction (X) of the strip (1) and the distance between the successive rollers (3) of the conveyor (4) is such that cutting can be performed without the rollers (3) being damaged. The apparatus can be used for cutting a continuously cast strip of anode copper into anodes (FIG. 1).

15 Claims, 16 Drawing Figures

APPARATUS FOR CUTTING A MOVING METALLIC STRIP INTO UNIFORM PIECES

The present invention relates to an apparatus for cutting a moving metallic strip into uniform pieces, comprising:
- a movable endless roller conveyor, the upper run of which carries the strip in a cutting zone,
- a carriage, located above the strip and adapted to move within said zone in the same direction as the strip and in the opposite direction, and
- a thermal cutting device, carried by said carriage and adapted to move transversally to the travelling direction of the strip.

When such an apparatus is working, the carriage moves in the same direction as the strip during a cutting operation and in the opposite direction between two successive cutting operations. It is of course important, in such an apparatus, that the conveyor rollers supporting the strip, should remain at a sufficient distance from the cutting device, as not to be damaged during the cutting.

Such an apparatus is described in the U.S. Pat. No. 3,443,805. In that known apparatus the conveyor is connected to the carriage by links in such a way that it is obliged to follow the back and forth movement of the carriage and that the cutting device cannot get close to the conveyor rollers. As a consequence the strip is always supported by the same rollers, while the cutting device also always stays in the neighbourhood of the same rollers. The distance separating the rollers, which are always in the neighbourhood of the cutting device, is greater than that separating the other rollers of the conveyor.

In that known apparatus it is nearly impossible to suitably cool the strip supporting rollers. As a consequence the rollers which are in the neighbourhood of the cutting device will get heated and will rapidly deteriorate. This will also be the case for the other strip supporting rollers, when the apparatus is used for cutting a very hot strip such as a strip leaving a continuous casting machine. Furthermore, in said known installation the time between two successive cutting operations is relatively long, as this time must be sufficient to bring back both the carriage and the conveyor to their starting position. As a consequence such an installation can only perform a relatively low number of cuttings per unit of time.

It is the object of the present invention to provide an apparatus of the above mentioned type which avoids the drawbacks of that known installation.

For this purpose, according to the invention, the above mentioned conveyor is adapted to revolve in such a way that its upper run continuously moves in the same direction as the strip, the distance between the successive rollers of the conveyor being such that the cutting can be performed without the rollers being damaged.

It is obvious that, when using the apparatus of the present invention, one has to take care that the conveyor moves in such a way that the cutting device cannot get too close to the rollers supporting the strip in the neighbourhood of the cutting line. For this purpose, it is possible to use human control, but it is more advantageous to provide the apparatus with automatic control- and regulating means, comprising first means for indicating the position of the conveyor rollers with respect to the position of the carriage and second means to make said first means act upon the speed of the conveyor and upon the cutting operation.

Said first means advantageously comprise an element pivoting around a pivot mounted on the carriage and a number of fingers equal to the number of successive rollers of the conveyor, said fingers being mounted on one side of the conveyor in such a way that the position of each of the successive rollers is witnessed by one of said fingers and the lower part of the pivoting element being adapted to be engaged by one of these fingers.

The carriage may be so conceived that it allows to cut only along a straight line transverse to the travelling direction of the strip, which is the case with the above mentioned apparatus of the prior art.

The carriage may also be so conceived that it allows to cut along any profile. In this case, the carriage is advantageously provided with a first element adapted to travel in a direction transverse to the travelling direction of the strip, means for moving said first element, a second element connected with the cutting device and with a guide rod and adapted to slide over the first element in a direction parallel to the travelling direction of the strip and a guide slot, rigidly fixed to the carriage, for the guide rod, the shape of said guide slot corresponding to the desired cutting profile.

The thermal cutting device advantageously comprises two plasma torches disposed to operate in parallel.

The apparatus of the invention is especially suited for cutting into anodes a continuously cast strip of anode copper.

Other details and particularities of the invention will appear from the description of an apparatus according to the invention for cutting a copper strip into anodes, given as a non limitative example and with reference to the accompanying drawings.

In the drawings:

and FIG. 16 respresents a strip cut into anodes.

Figure 1:
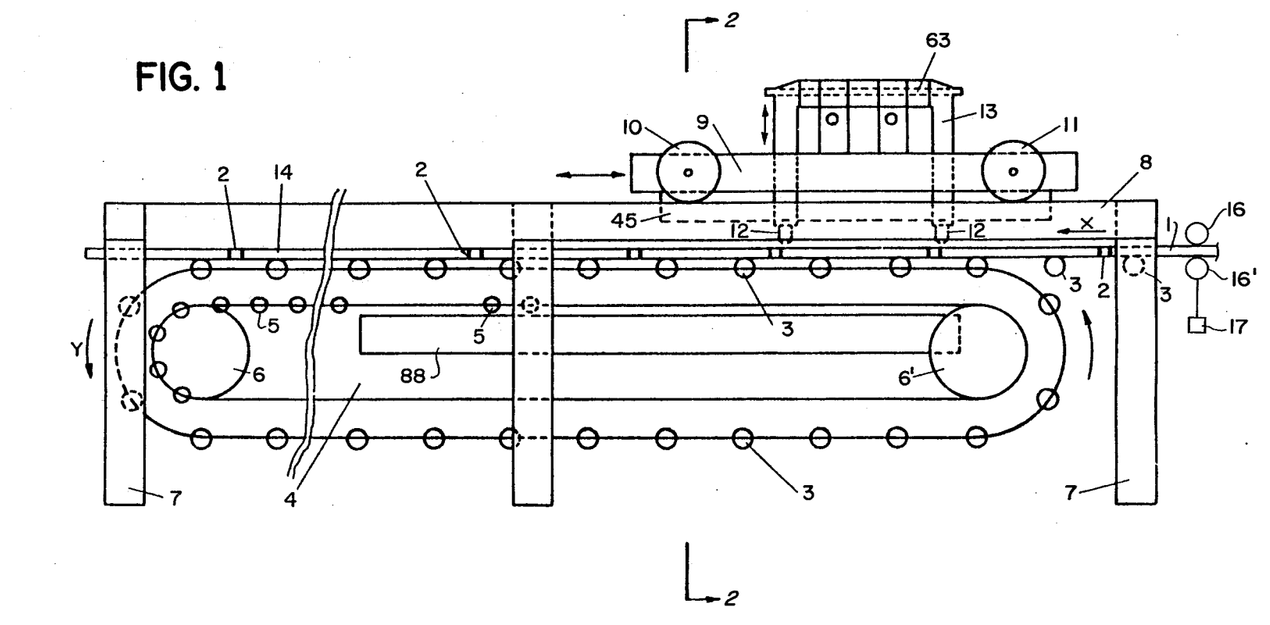
FIG. 1 is a lateral schematic view of the carriage carrying the cutting device and of the roller conveyor supporting a strip of anode copper to be cut.

Referring now to FIG. 1, the metallic strip 1 provided with projecting lugs 2 and coming from a continuous casting machine not represented on the figure, is supported by the rollers 3 of an endless conveyor 4 and moves in the direction of arrow X. The rollers 3 are mounted on two endless chains 5 passing each around two toothed wheels 6 and 6'. The two driving toothed wheels 6 rotate in the direction of arrow Y driving the endless chains 5 and thus the rollers 3.

The conveyor 4 is mounted in a frame 7 the two upper longitudinal sides of which support two rails 8. A torch bearing carriage 9 carried by two pairs of wheels 10 and 11, travels on rails 8 with a backward and forward motion.

Figure 9:
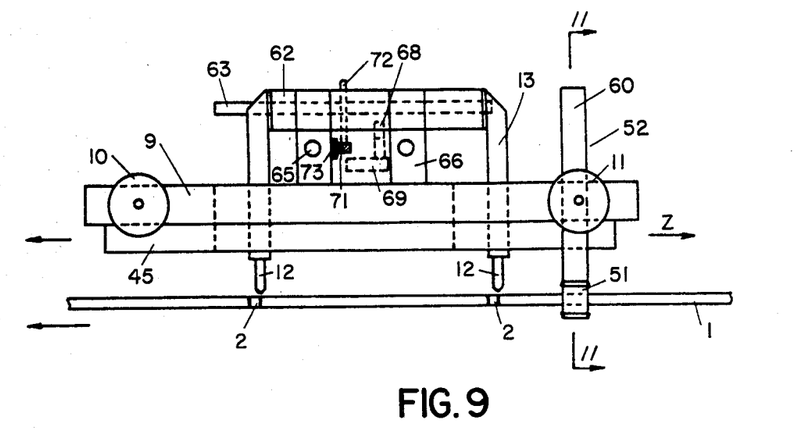
FIG. 9 is a more detailed view of the carriage of FIG. 1.

The carriage 9 carries two plasma torches fixed to arms 13 (FIGS. 1 and 9).

The travelling speed of the metallic strip 1 on conveyor 4 is commanded by a pair of pinch-rolls 16 and 16', located between the not shown continuous casting machine and the cutting apparatus, and of which both rolls 16 and 16' are driven by a motor 17.

Figures 2, 3, 4:
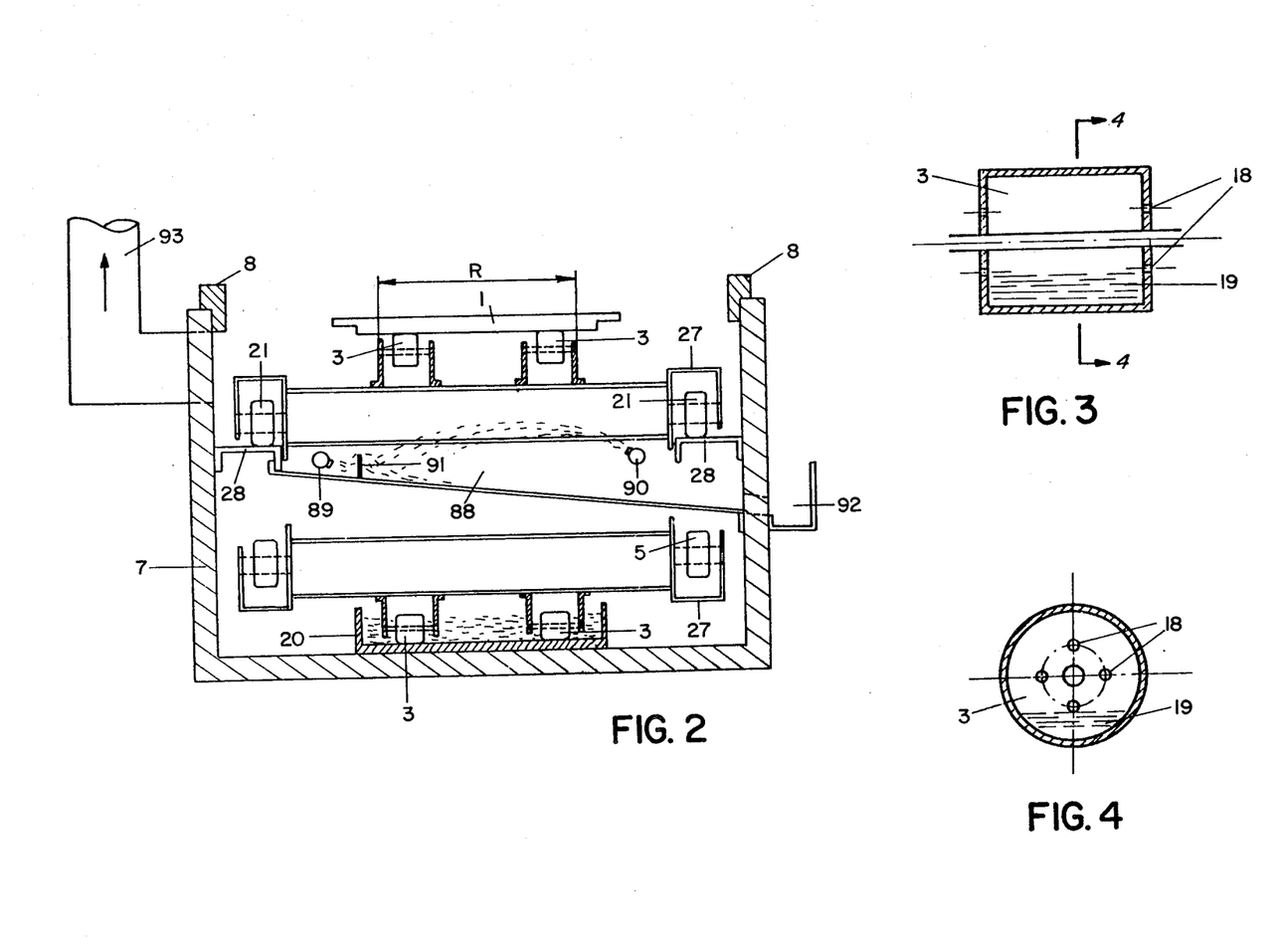
FIG. 2 is an enlarged cross-section taken along the line II—II of FIG. 1.
FIG. 3 is an enlarged axial section of a roller of the conveyor of FIG. 1.
FIG. 4 is a cross-section taken along the line IV—IV of FIG. 3.

FIGS. 3 and 4 show an enlarged view of the rollers 3 carrying the metallic strip 1. As this metallic strip has a temperature comprised between 700° and 850° C. when it reaches the cutting zone, it is necessary to cool the rollers which support it. For this purpose the rollers 3 are provided with side apertures 18, through which a cooling liquid 19, for example water, can be introduced into the space comprised between the axle and the exterior cylinder of the roller.

FIG. 2 shows how the rollers 3, after they have left the hot metallic strip 1 at the end of the conveyor 4, dip into a tank of cooling water 20 disposed under the conveyor. In order to reduce stress in the chains 5 of the conveyor, the rollers 3 roll on the bottom of cooling tank 20.

Figure 5:
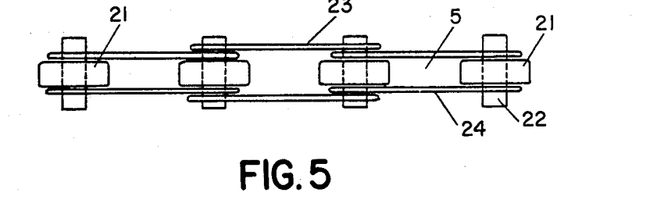
FIG. 5 is an enlarged plan view of a part of a chain of the roller conveyor of FIG. 1.
Figure 6:
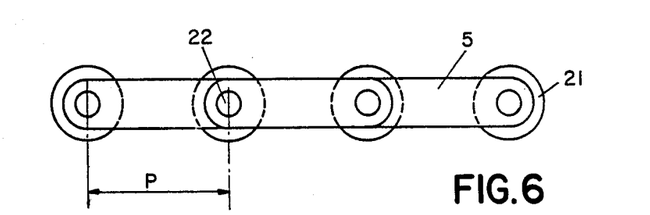
FIG. 6 is a lateral view of the chain part of FIG. 5.
Figure 7:
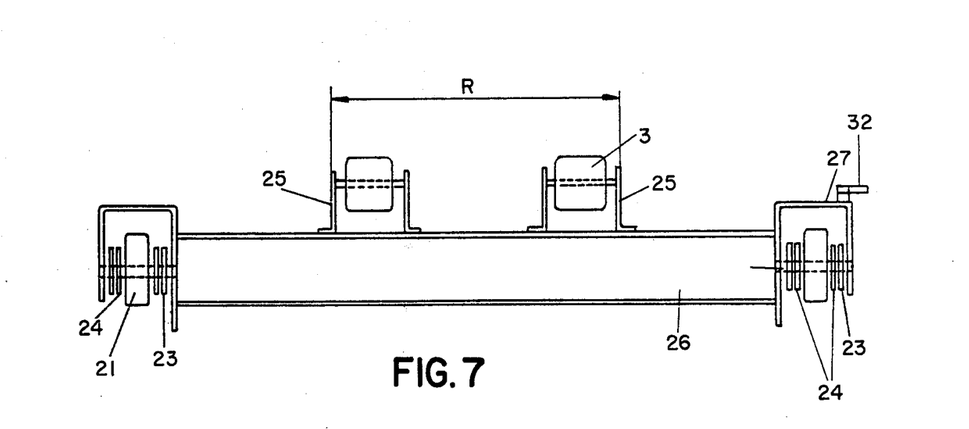
FIG. 7 is an elevational view of two rollers of the conveyor, mounted between the two chains which move the conveyor of FIG. 1.
Figure 8:
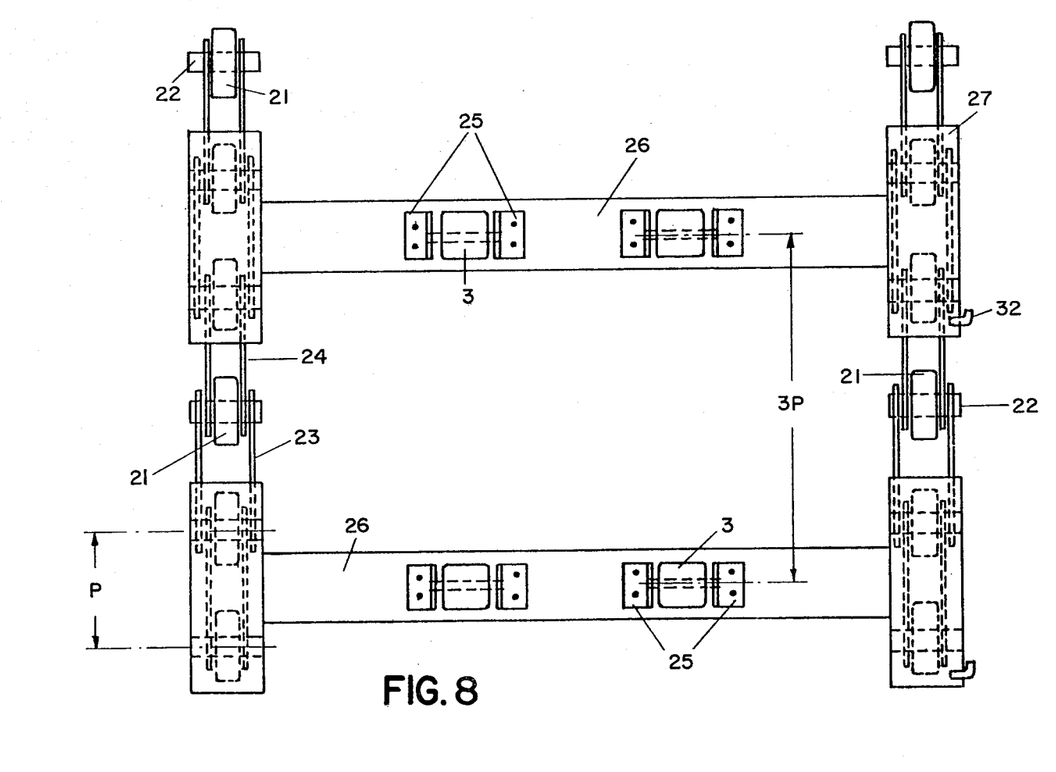
FIG. 8 is a plan view of two pairs of rollers mounted between the two chains which move the conveyor of FIG. 1.

The two chains 5 (FIGS. 5 and 6) are of the commercial type with rollers 21 mounted on hollow axles 22, and kept at a regular distance by pairs of outer side plates 23 and inner side plates 24. The distance between the axles of two successive rollers 21 is the pitch of the chain. This pitch p, of e.g. 16 cm, is a submultiple of the length of the anodes to cut, e.g. 96 cm. Rollers 3 are mounted in bearings 25 (FIGS. 7 and 8) disposed on transversal girder 26; each girder is carried by two pairs of rollers 21 of chains 5. Only two links out of three of chains 5 carry such a system of two rollers 3, so that the distance between two successive rollers 3 is 3 p. The girders 26 are welded to caps 27 spanning each two rollers 21, said caps being fixed to the rollers 21 with bolts disposed in the hollow axles 22. In this way, the rollers 3, which carry the cast metallic strip 1 are rigidly mounted on the links of the two chains 5.

The rollers 21 of the upper run of driving chains 5, with support the weight of metallic strip 1 through the rollers 3, roll over two rails 28 (FIG. 2) welded to the frame 7 of the conveyor, while the rollers 21 of the lower run are for their part supported by rollers 3 rolling on the bottom of cooling tank 20. The two driving pinions 6 of the conveyor are driven by a not shown electric motor. Due to a synchronization between motor 17 which drives the pinch-rolls and the not shown motor which drives the pinions 6, the speed of conveyor 4 is normally identical with that of metallic strip 1 which it carries; this speed can however be regulated by an automatic control device.

At the beginning of a cutting cycle, the two torches 12 are disposed each behind an anode lug 2 (FIG. 9). The detection of lug 2 is effectuated, for example, by means of a photo-electric cell (not shown) mounted on torch-bearing carriage 9, which cell gives, after detection of the lug, a signal for coupling carriage 9 to strip 1 by means of a coupling device which will be described further, so that at this moment carriage 9 with plasma torches 12 each in cutting position behind a lug 2, is travelling at the same speed as strip 1. That cell also transmits to torches 12 a signal for starting the cutting operation, which means that the torches are ignited and start their travelling along a predetermined cutting profile; that signal will be called further cutting signal. In order to avoid damaging the rollers 3 during the cutting, it is necessary that the torches should be in a narrow zone x (FIG. 15) located in the middle of the space separating two successive rollers 3. If the torches, at the moment the cutting should start, are too close to a roller 3, the cutting signal will be delayed and conveyor 4 will be accelerated or slowed down until the torches are within said zone x.

Figure 15:
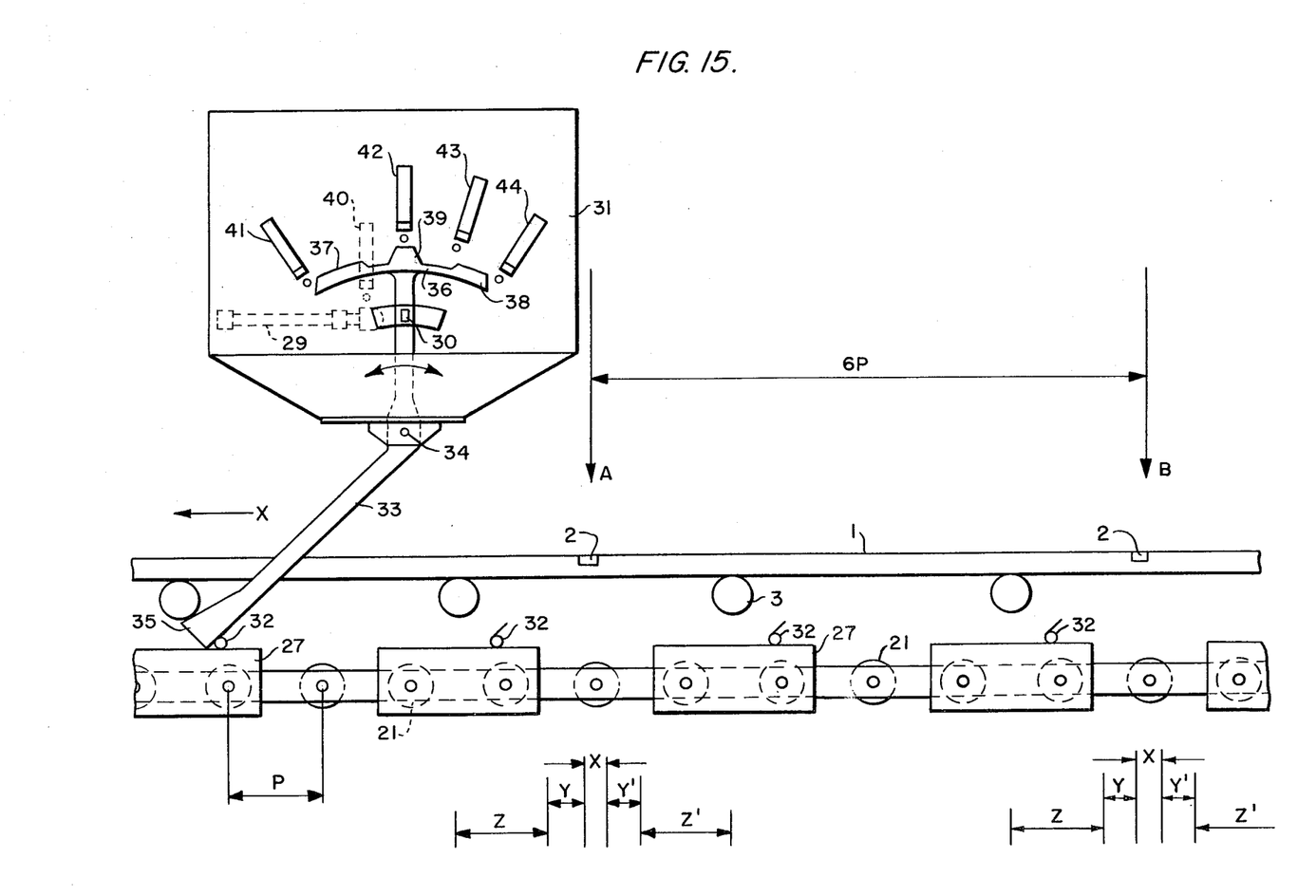
FIG. 15 is a lateral schematic view of the device for detecting the position of the carriage with respect to the conveyor rollers in the cutting zone.

In order to detect the position of torches 12 with respect to that of rollers 3, at the moment the cutting should start, the torch-bearing carriage 9 is provided with a detecting device 31 which, for the sake of clarity, has been represented on a larger scale than the other elements of FIG. 15, and which comes into action when torch-bearing carriage 9 has been coupled to strip 1. The detecting device 31 comprises a lever 33, which can pivot around an horizontal axle 34 mounted on carriage 9. Said lever 33 is provided at its lower end with a skid 35 which, when passing along a cap 27, is lifted by a finger 32 disposed on and projecting laterally beyond cap 27. The upper end of lever 33 is made of a segment of a circle 36 carrying three cams 37, 38 and 39 whose function it is to actuate relays 41, 42, 43 and 44. Cams 37 and 38 have the same height and actuate respectively relays 41 and 44; cam 39 is higher than cams 37 and 38 and actuates relays 42 and 43.

Between two successive cutting operations, the torch-bearing carriage 9 returns to its original position. During this travelling, lever 33 is lifted above finger 32, by means of an hydraulic cylinder 29 bearing on a lug 30 disposed on the upper part of lever 33. The coming out of the piston of the hydraulic cylinder 29, actuates a relay 40 which prevents the working of torches 12, until torch-bearing carriage 9 has reached its new cutting position and has been coupled to strip 1. At this moment the piston of hydraulic cylinder 29 withdraws to its original position, thus liberating lever 33 and deactuating relay 40. At this moment also, the torches are either above a narrow zone x, located in the middle of the space separating two successive rollers 3 (FIG. 15), or above zones y or y' adjacent to said zone x, or above zones z or z' located nearer to and within the rollers 3.

As the length of the anodes is an exact multiple of pitch p of the driving chains 5, and is equal to two times the distance between two successive rollers 3, the torches 12 will only come above a zone z or z', at the moment the cutting apparatus is started. Once the apparatus is working normally, the torches will every time come back normally above a zone x. Small variations of the distance between two successive anode lugs 2 are however possible, e.g. when the temperature of the strip changes. In this case a small shifting may occur so that the torches 12 may be above a zone y or y' at the moment a cutting operation should start.

It is the task of detecting device 31, to detect the position of torches 12, as mentioned above and to bring said torches back above a zone x. This device works in the following way.

When the torches, each in cutting position behind a lug 2, are above a zone x, lever 33 is slightly lifted by a finger 32 in the position shown on FIG. 15. The position of the torches is shown by the arrows A and B. In this position, cam 39 actuates relay 42 which lets pass the cutting signal.

When torches 12, at the moment the cutting should start, are above a zone y and are thus closer to the roller 3 situated at their left on FIG. 15, the skid 35 of lever 33 is lifted by finger 32 at a lower height, lever 33 rotates around its pivot 34, and cam 39 moves away from relay 42 to the left, while cam 37 actuates relay 41. In this position of the torches, relay 41 lets pass the cutting signal and transmits to conveyor 4 a signal for acceleration whereby the latter is accelerated during the cutting until cam 39 again actuates relay 42 and the torches 12 are again above zone x.

When torches 12, at the moment the cutting should start, are above a zone y', the skid 35 is lifted by finger 32 at a greater height, cam 39 moves away from relay 42 to the right, while cam 38 actuates relay 44. In this position of the torches, relay 44 lets pass the cutting signal and transmits to conveyor 4 a signal for deceleration whereby the latter is slowed down during the cutting until cam 39 again actuates relay 42.

When torches 12, at the moment the cutting should start, are above a zone z', skid 35 is lifted at about its maximum height by finger 32, cam 39 moves away from relay 42 to the right and actuates relay 43. In this position the cutting signal is delayed and conveyor 4 is accelerated until the following finger 32 lifts skid 35 and actuates first, through cam 37, relay 41 which lets pass the cutting signal and afterwards, through cam 39, relay 42 which cancels the acceleration of conveyor 4. However, during this acceleration of conveyor 4, the lever 33, suddenly released by finger 32, that kept it lifted, falls in its lowermost position, whereby actuating during its fall for short while relay 44 through cam 38, relay 42 through cam 39 and relay 41 through cam 37. To prevent relays 41, 42 and 44 from letting pass at this moment the cutting signal, relay 43 after being released by cam 39, stays engaged for another three seconds; this is largely sufficient to allow lever 33 to reach its lowermost position.

When torches 12, at the moment the cutting should start, are above a zone z, skid 35 is at its lowermost position between two fingers 32; no relay is actuated by cams 37, 38 or 39, cam 37 being at this moment completely at the left of relay 41, cam 39 being between relays 41 and 42 and cam 38 being at the left of relay 42. In this position the cutting signal is delayed and conveyor 4 is accelerated until skid 35 is lifted by a finger 32 and actuates first, through cam 37, relay 41 which lets pass the cutting signal and afterwards, through cam 39, relay 42 which cancels the acceleration of conveyor 4.

Thus, the cutting signal is delayed when relay 43 is actuated and when none of the relays 41, 42, 43 and 44 is actuated. This arrangement is particularly useful when rollers 3 are located just beneath the lateral edges of strip 1. However, when these rollers are located at some distance from said edges, as it is the case in the present example (FIG. 2), it is also possible to let pass the cutting signal even if, at the moment the cutting should start, relay 43 is actuated or none of the relays 41, 42, 43 and 44 is actuated. In that case, means should be provided for delaying the cutting signal if, at the moment the torches are reaching the roller zone R (FIGS. 2 and 7), relay 43 is still actuated or relays 41, 42, 43 and 44 are still unactuated. Those means may comprise, for example, a switch which is engaged by one of the torches when reaching roller zone R.

As mentioned here above, the metal strip 1, arriving in the cutting zone, has a temperature comprised between 700° and 850° C.

Figure 10:
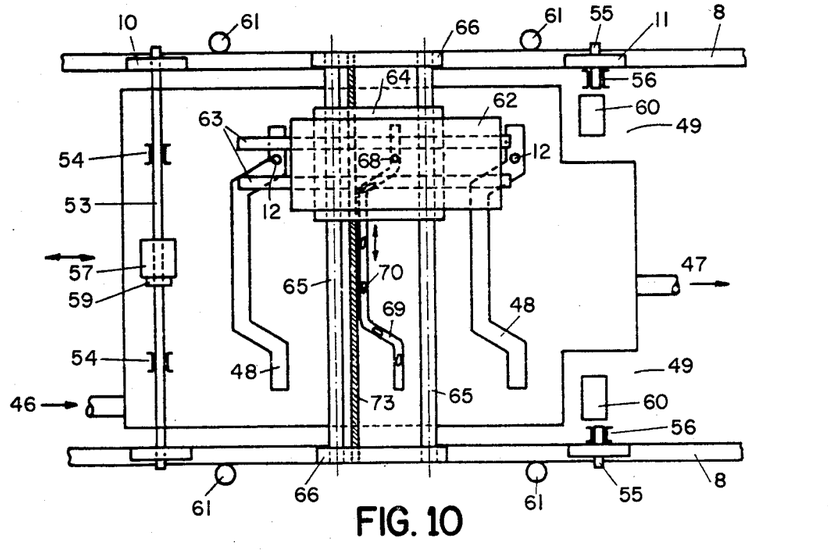
FIG. 10 is a plan view of the carriage of FIG. 9.
Figure 11:
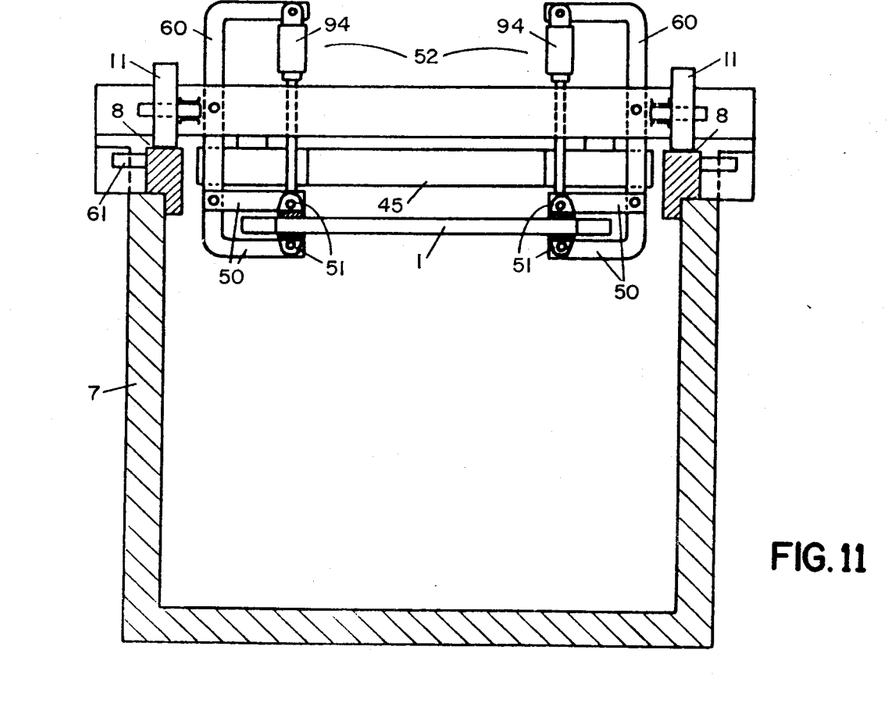
FIG. 11 is a cross-section taken along line XI—XI of FIG. 9.

In order to protect the carriage 9, which carries the cutting device against the radiant heat of metal strip 1, said cutting device is separated from metal strip 1 by a protective screen 45 fastened to torch bearing carriage 9. Said screen 45 is constituted by a hollow box in which circulates a cooling liquid introduced through an inlet 46 (FIG. 10) and which leaves the box through an outlet 47. Screen 45 is also provided with two transversal shaped slots 48 which allow the passage and the transversal travelling of the plasma torches 12 during the cutting of the metallic strip. Screen 45 is also provided at its rear with two recesses 49 (FIG. 10) which allow the passage of two levers 60, carrying two coupling clutches 51 which are part of a coupling device 52 mounted at the rear of torch bearing carriage 9 (FIGS. 9 and 11).

Torch-bearing carriage 9 travels on two rails 8 mounted on frame 7 along conveyor 4, and is carried by two pairs of wheels 10 and 11 of which only wheels 10 are driving. Said driving wheels 10 are mounted on an axle 53 in two bearings 54 (FIG. 10) at the front of the carriage, while the two back wheels 11 are each mounted free on a shaft 55 in a bearing 56. An electric motor 57 drives the two front wheels 10 through coupling 59 and brings the torch-bearing carriage 9 back to its starting position after the cutting operation, for example by means of a not represented relay. During the entire cutting operation of an anode, torch-bearing carriage 9 is coupled to metal strip 1 to be cut, by means of a coupling device 52 mounted at its rear and which will be described further and as a result, travels at the same speed as metal strip 1 in the direction of arrow X (FIG. 1). The straight motion of carriage 9 on rails 8 is ensured by four guide rollers 61 (FIGS. 10 and 11) leaning against the external side of rails 8.

The two plasma torches 12, the lower end of which is located a few mm above metal strip 1, are carried by arms 13 fastened to the two ends of an upper table 62 which can slide over two longitudinal shafts 63 which are parallel to rails 8 and which allow a backward and forward motion of table 62 in the longitudinal direction of torch-bearing carriage 9. The two shafts 63 are fastened to a lower table 64 which can slide itself over two transversal shafts 65, which are perpendicular to the travelling direction of torch-bearing carriage 9 and which allow a backward and forward motion of lower table 64 in a direction transversal to the torch-bearing carriage 9. Said two traversal shafts 65 are carried by two supports 66 mounted on torch-bearing carriage 9.

During the anode cutting operation, the two plasma torches 12 travel along a path the profile of which is similar to the profile 67 of the edge of anode 14 (FIG. 16). Said travelling is controlled by a guide rod 68 the upper end of which is rigidly fixed to upper table 62 which carries the two plasma torches 12, and the lower end of which is formed by a roller adapted to rotate freely around the axis of guide rod 68 in a guide slot 69. Guide slot 69 is rigidly fixed to torch-bearing carriage 9 and has the same profile as anode 14. During the transversal travelling of lower table 64 on transversal shafts 65, guide rod 68 and thus also the two plasma torches 12 which are connected to it, travel according to the profile of guide slot 69.

It is possible to replace guide slot 69 by a slot presenting another profile, thus making it possible to cut anodes with any profile. The slots 48, made in cooling screen 45, and which allow the passage of plasma torches 12, have a width which is sufficient to allow the travelling of torches 12 along these different paths. The bottom of guide slot 69 may be provided with holes 70 allowing the evacuation of the dirt for example lubricant residue, thus freeing the way for guide rod 68. The transversal travelling of lower table 64 on shafts 65 is controlled by a not represented electric motor, located on said table 64 and which drives a pinion 71 (FIG. 9) mounted at the lower end of a shaft 72. The teeth of pinion 71 engage with the teeth of a fixed linear rack 73 disposed transversally on torch-bearing carriage 9. During its rotation toothed wheel 71 travels along rack 73, dragging with it at the lower table 64 which slides over the two transversal shafts 65, and guide rod 68 which travels along guide slot 69, so that the two plasma torches 12, connected to guide rod 68, travel along a path which is similar to that of guide slot 69.

Figure 13:
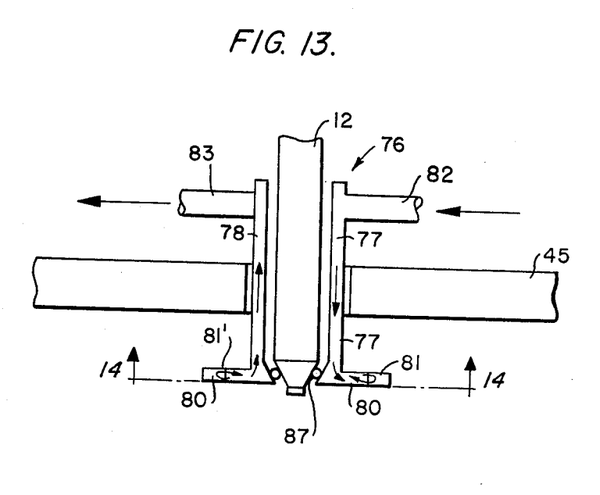
FIG. 13 is an axial section of a torch provided with a cooling screen.
Figure 14:
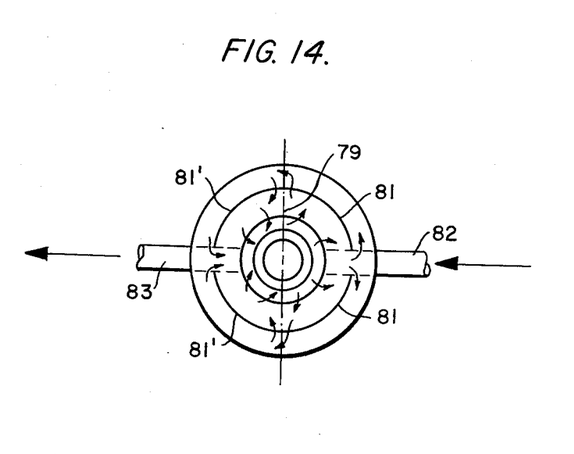
FIG. 14 is a cross-section taken along line XIV—XIV of FIG. 13.

The plasma torches 12 are of the commercial type with an individual internal cooling system not shown on the figure. This cooling system is however insufficient to protect the torches against the radiant heat of metal strip 1. In order to ensure their adequate protection, each torch 12 is also provided with a heat protecting sheath 76 (FIGS. 13 and 14).

This protecting sheath is made of a hollow cylindrical sleeve axially divided into two semi-cylinders 77 and 78 by means of a vertical wall 79 and which extends over a part of the height of plasma torch 12 from about the lower end of said plasma torch until above the higher level of protecting screen 45. At their lower part, under protecting screen 45, both semi-cylinders 77 and 78 flare thus forming a hollow circular plate provided with distribution baffles 81 and 81' which have the form of an arc of a circle. The protecting sheath 76 is further provided with a conduit 82 for the inlet at the cooling liquid, and a conduit 83 for the outlet of the cooling liquid. A tightening ring 87 is disposed between circular plate 80 and the lower end of plasma torch 12.

The cooling liquid, e.g. water, comes into the protecting sheath through inlet conduit 82, flows down along semi-cylindrical sleeve 77, comes into the right part of cylindrical plate 80, flows around the two baffles 81 and from there penetrates into the left part of plate 80, flows around baffles 81', climbs along semi-cylindrical sleeve 78 and leaves the protecting sheath through outlet conduit 83.

Conveyor 4 is provided beneath the cutting zone, with a cooling tank 88 (FIG. 2) located under rollers 3 which support the metal strip 1. A cooling liquid, the purpose of which is to precipitate the metal vapors formed during the cutting, is brought into tank 88, by means of two conduits 89 and 90 provided with a series of small apertures. Conduit 90 sprays or pulverises water in the form of a thin horizontal veil directly under metal strip 1, to precipitate the metal vapours, while the water brought by conduit 89, flows over a weir 91 and the inclined bottom of cooling tank 88 toward a gutter 92, dragging with it scales and oxidized metal particles formed during the cutting operation. The fumes formed during the cutting operation are evacuated through stack 93.

During the cutting of the anodes, the torch-bearing carriage 9 is coupled to metal strip 1 and travels with it. The coupling is realized by means of two clutches 51 located at the rear of torch-bearing carriage 9, as mentioned above. Clutches 51 which are supported by two arms 50, which themselves are connected to two levers 60, pass through recesses 49 made in cooling screen 45. These clutches 51, which are simultaneously driven by a pneumatic or an hydraulic cylinder 94, grip the side edges of metal strip 1 when plasma torches 12 are in cutting position and release the metal strip when the cutting of two anodes is finished, thus freeing torch-bearing carriage 9 which is then brought to a new cutting position by means of electric motor 57. To avoid jarring at the moment of the coupling to the metal strip 1, torch-bearing carriage 9 may be first brought to a position upstream of its cutting position and then progressively accelerated by means of the same motor 57, in the travelling direction of metal strip 1; in this case the clutches grip the metal strip when the speeds of both the torch-bearing carriage and the metal strip are nearly equal.

The linear travelling speed of the driving pinion 71 along rack 73 can be regulated by means of a not represented thyristor device. By appropriate variation of this speed, it is possible to obtain a constant cutting speed along the non linear path of guiding rod 68, between the start and the end of the cutting, which are preferably effectuated at reduced speed.

Figure 12:
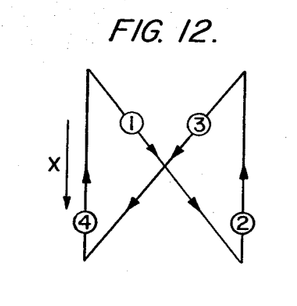
FIG. 12 is a diagram of the cyclic movement of the cutting device.

The two plasma torches 12 execute the cutting of strip 1 with a four-stroke cyclic movement schematically represented in FIG. 12, where arrow X shows the travelling direction of metal strip 1, strokes 1 and 3 corresponding each to a cutting by plasma torches 12 along the profile of guide slot 69, and strokes 2 and 4 corresponding to the backward motion of the plasma torches respectively to an intermediate position and to the original starting position.

The anodes 14 which have been cut, leave the cutting zone, still carried by rollers 3 of conveyor 4 and arrive at an evacuation zone located at the end of conveyor 4, where they are lifted two by two and evacuated by conventional means (not shown).

What we claim is:

1. An apparatus for thermally cutting a moving metallic strip into uniform pieces, which comprises:
   (a) a movable endless roller conveyor, the upper run of which carries the strip in a cutting zone, said conveyor being adapted to revolve in such a way that its upper run continuously moves in the same direction as the strip;
   (b) a carriage, located above the strip and adapted to move within said zone in the same direction as the strip and in the opposite direction;
   (c) means for coupling the carriage to the strip;
   (d) a thermal cutting device, carried by said carriage and adapted to move transversally to the travelling direction of the strip;
   (e) synchronization means for imparting to the endless roller conveyor a speed that is equal to that one of the strip; and
   (f) control means including first means for sensing the position of the conveyor rollers relative to the position of the carriage and adapted to sense a multiplicity of distinct relative positions, second means operable in response to said first means for increasing the speed of the endless roller conveyor until the cutting device reaches a position at a predetermined distance from one of the rolls of the roller conveyor, third means operable in response to said first means for lowering the speed of the endless roller conveyor until the cutting device reaches a position at a predetermined distance from one of the rolls of the roller conveyor, and fourth means operable in response to said first means for preventing operation of the cutting device when the latter is within a predetermined distance from one of the rolls of the roller conveyor, said second, third and fourth means being operable during the transverse movement of the cutting device.

2. The apparatus of claim 1 wherein the distance between axles of two successive rollers of said roller conveyor is a sub multiple of the length of said uniform pieces.

3. The apparatus of claim 1 wherein said roller conveyor comprises two parallel endless chains, means for mounting said endless chains, and wherein said roller conveyor further comprises a plurality of rollers, and means for mounting each roller to said endless chains.

4. The apparatus of claim 1 further comprising a tank filled with a cooling liquid, each of the rollers moving through said tank to be cooled before supporting the strip.

5. The apparatus of claim 4 wherein each roller is formed with an inner cavity and including means for providing communication from the exterior of said rollers to each said cavity for entry of said cooling liquid.

6. The apparatus of claim 1 wherein said first means comprises an element adapted to pivot around a pivot mounted on the carriage and a plurality of fingers equal to the number of successive rollers of the conveyor, said fingers being mounted on one side of the conveyor in such a way that the position of each of the successive rollers is witnessed by one of said fingers and the lower part of the pivoting element being adapted to be engaged by one of these fingers.

7. The apparatus of claim 6 further comprising means for lifting the lower part of said pivoting element above the level of said fingers when the carriage moves in the opposite direction of the strip.

8. The apparatus of claim 1 characterized in that the carriage is provided with a first element adapted to travel in a direction transverse to the travelling direction of the strip, means for moving said first element, a second element connected with the cutting device and with a guide rod and adapted to slide over the first element in a direction parallel to the travelling direction of the strip and a guide slot, rigidly fixed to the carriage, for the guide rod, the shape of said guide slot corresponding to the desired cutting profile.

9. The apparatus of claim 8 characterized in that the carriage is provided with means for driving the first element at such a speed that the cutting speed remains constant.

10. The apparatus of claim 1 characterized in that the thermal cutting device is made of two plasma torches disposed to operate in parallel.

11. The apparatus of claim 1 characterized in that it comprises means for spraying a cooling liquid under the lower surface of the strip in said cutting zone and a tank for collecting the sprayed liquid.

12. The apparatus of claim 1 characterized in that the carriage is provided at its lower part with a protective screen against the heat.

13. The apparatus of claim 12 characterized in that the screen is formed by a box adapted to be cooled by circulation of a cooling liquid.

14. The apparatus of claim 1 further comprising means for moving said carriage, said moving means adapted to control the speed of movement of the carriage so that at the moment said carriage is coupled to said strip said carriage is moving at a speed substantially equal to the speed of movement of said strip.

15. An apparatus of claim 1 characterized in that the thermal cutting device is provided with a sheath adapted to be cooled by circulation of a cooling liquid.

* * * * *

UNITED STATES PATENT AND TRADEMARK OFFICE
CERTIFICATE OF CORRECTION

PATENT NO. : 4,303,227

DATED : December 1, 1981

INVENTOR(S) : John M. A. Dompas

It is certified that error appears in the above-identified patent and that said Letters Patent are hereby corrected as shown below:

Column 7, line 24, "dragging with it at the lower table 64"

should read -- dragging with it the lower table 64 -- .

Signed and Sealed this

Sixteenth Day of March 1982

[SEAL]

Attest:

Attesting Officer

GERALD J. MOSSINGHOFF

*Commissioner of Patents and Trademarks*